United States Patent
Ferren et al.

(10) Patent No.: US 7,047,418 B1
(45) Date of Patent: May 16, 2006

(54) IMAGING METHOD AND DEVICE USING BIOMETRIC INFORMATION FOR OPERATOR AUTHENTICATION

(75) Inventors: Bran Ferren, Beverly Hills, CA (US); W. Daniel Hillis, Toluca Lake, CA (US); Clinton Blake Hope, Burbank, CA (US)

(73) Assignee: Applied Minds, Inc., Glendale, CA (US)

( * ) Notice: Subject to any disclaimer, the term of this patent is extended or adjusted under 35 U.S.C. 154(b) by 846 days.

(21) Appl. No.: 09/995,268

(22) Filed: Nov. 27, 2001

Related U.S. Application Data

(60) Provisional application No. 60/250,955, filed on Nov. 29, 2000.

(51) Int. Cl.
*H04K 1/00* (2006.01)

(52) U.S. Cl. .................. 713/186; 713/176; 726/26; 382/115; 382/117; 382/124

(58) Field of Classification Search .................. None
See application file for complete search history.

(56) References Cited

U.S. PATENT DOCUMENTS

| | | | | |
|---|---|---|---|---|
| 5,499,294 | A | 3/1996 | Friedman | 380/10 |
| 5,764,770 | A | 6/1998 | Schipper et al. | 380/25 |
| 5,799,082 | A | 8/1998 | Murphy et al. | 380/7 |
| 5,828,751 | A | 10/1998 | Walker et al. | 380/25 |
| 5,898,779 | A | 4/1999 | Squilla et al. | 380/23 |
| 5,987,136 | A | 11/1999 | Schipper et al. | 380/25 |
| 6,005,936 | A | 12/1999 | Shimizu et al. | 380/4 |
| 6,111,954 | A | 8/2000 | Rhoads | 380/54 |
| 6,125,192 | A * | 9/2000 | Bjorn et al. | 382/124 |
| 6,208,746 | B1 * | 3/2001 | Musgrave | 382/100 |
| 6,389,151 | B1 * | 5/2002 | Carr et al. | 382/100 |
| 6,433,818 | B1 * | 8/2002 | Steinberg et al. | 348/161 |
| 6,453,416 | B1 * | 9/2002 | Epstein | 713/170 |
| 6,804,378 | B1 * | 10/2004 | Rhoads | 382/100 |
| 6,870,946 | B1 * | 3/2005 | Teng et al. | 382/124 |
| 2004/0069846 | A1 * | 4/2004 | Lambert | 235/382 |
| 2005/0036656 | A1 * | 2/2005 | Takahashi | 382/100 |

OTHER PUBLICATIONS

Schneier, B., Applied Cryptography, 1996, John Wiley & Sons, 2nd Edition, pp. 34-41.*
*Welcome*; Dermalog Welcome; www.dermalog.de/english/dermalog-Startseite.html.
*Kodak Bundle Teams Digital Camera With Handheld GPS Unit*; Staff Report; Jun. 19, 1999; maccentral.macworld.com/news/9906/19.kodak.shtml.
*First Fully Authenticated Digital Video Surveillance System Features Advanced RSA Security Technology*; Oct. 23, 1995; RSA Security; www.rsasecurity.com/news/pr/950923.html.

* cited by examiner

*Primary Examiner*—Gilberto Barrón, Jr.
*Assistant Examiner*—Minh Dinh
(74) *Attorney, Agent, or Firm*—Michael A. Glenn; Glenn Patent Group

(57) ABSTRACT

Essentially coincident with the capture of an image by the imaging device, biometric information indicating the identity of the operator of the device is obtained from at least one biometric sensor. The biometric information and captured image are then stored in a manner reliably associating each with the other. At a later time, biometric information is obtained from a supposed operator of the imaging device. By comparing this candidate biometric information with the stored biometric information, the supposed operator may be authenticated as the operator of the imaging device at the time of capture of the stored image.

44 Claims, 7 Drawing Sheets

IMAGING METHOD AND DEVICE USING BIOMETRIC INFORMATION FOR OPERATOR AUTHENTICATION

RELATED APPLICATIONS

This application claims priority to U.S. Provisional Application No. 60/250,955, filed Nov. 29, 2000.

BACKGROUND

1. Technical Field

This invention relates to the field of imaging devices. More particularly, the invention relates to methods and devices for capturing information for authentication of the imaging device operator.

2. Description of the Prior Art

In many situations, an ability to determine with certainty the details surrounding the creation of a photographic image is of great importance. Information such as the identity of the photographer and the date, time, and location of image creation may all lend credibility to images that are used in legal proceedings, scientific research, and other fields. The advent and wide distribution of computerized tools allowing for the duplication, modification, or outright falsification of images has heightened the importance of methods providing such authenticating information.

Several currently available technologies attempt to address these concerns.

For example, widely known are cameras that document the date and time of the image creation, storing this information either directly within the image or elsewhere on the film. The Kodak Advantix™ system allows cameras to record additional information on the film, such as image indexing and film processing instructions.

Other technologies have allowed the location of image creation to be documented.

The GPS DIGITA system, developed by Kodak, allows the precise location of image creation, as determined by a Garmin GPS III Plus global positioning unit, to be recorded in the digital image captured by a Kodak DC265 camera.

Another aim of prior art technologies has been ensuring the integrity of a photograph following creation thereof. U.S. Pat. No. 5,499,294 discloses a digital camera that prevents modification or falsification of digital image content. "The digital camera processor has embedded therein a private key unique to it, and the camera housing has a public key that is so uniquely related to the private key that digital data encrypted with the private key may be decrypted using the public key.

The digital camera processor comprises means for calculating a hash of the image file using a predetermined algorithm, and second means for encrypting the image hash with the private key, thereby producing a digital signature. The image file and the digital signature are stored in suitable recording means so they will be available together. Apparatus for authenticating the image file as being free of any alteration uses the public key for decrypting the digital signature, thereby deriving a secure image hash identical to the image hash produced by the digital camera and used to produce the digital signature. The authenticating apparatus calculates from the image file an image hash using the same algorithm as before. By comparing this last image hash with the secure image hash, authenticity of the image file is determined if they match."

U.S. Pat. No. 5,898,779 describes a similar system operating on only a portion of the digital image. "The encryption system further comprises means for generating one or more patterns each composed of at least one individual area that is visible together with the image of the object, means for designating at least one individual area as an active area of the image suitable for authentication and for generating location data identifying the active area, and means for calculating image hash from image data of the active area of the image using a predetermined hash algorithm. The image hash is then encrypted with the embedded private key, thereby producing a digital signature uniquely associated with the active area of the image." The digital signature may then be used to verify the authenticity of the digital image as disclosed in U.S. Pat. No. 5,499,294, the use of only a selected portion of the image offering computational savings.

U.S. Pat. No. 6,005,936 discloses a method that obviates the need for recording a separate digital signature, embedding the authenticating information directly within the digital image. Specifically, the invention "divides the digital image into first and second regions. Authentication information is generated from data in the first region, which information is then encrypted. The encrypted authentication information is embedded into the second image region". Finally, U.S. Pat. No. 6,111,954 discloses a steganographic method for recording authenticating information within an image stored on an emulsion film. "The marking encodes digital information, yet is essentially imperceptible to the human eye."

However, none of these prior art technologies incorporate or record information in a manner providing reliable identification of the photographer. Thus, while the integrity of the image itself may be ensured, the identity of the photographer remains in question. Biometric identification technologies provide a convenient yet reliable approach to addressing this deficiency. Such technologies are both accurate, due to the unique nature of the physical traits use in the identification process, and reliable, due to the diffculty in falsifying such traits.

Several biometric identification techniques are currently available. Systems such as the Infineon FingerTIP™ and Biotouch Identix™ identify an individual based on fingerprint patterns. Such finger scanning systems analyze a fingerprint pattern to find distinctive minutiae, i.e. discontinuities that interrupt the ridge patterns of a fingerprint. The nature and location of the minutiae are noted, creating a record uniquely associated with the scanned fingerprint. Techniques have also been developed to identify individuals based on the shape and pattern of an entire hand.

There are also several technologies that identify a user based on the patterns within an individual's eye. Such eye sensors record and analyze patterns within the subject's iris or retina. Iris scanners, such as the IriScan™ system offered by Iridian, Inc., are both reliable and convenient. Retinal scanners such as theICam 2001™ manufactured by Eye-Dentify, while more intrusive and typically requiring a more cooperative subject, offer unsurpassed reliability.

What is needed is an imaging device that provides a biometric mechanism for authenticating the photographer of an image. It would be advantageous to provide a device that uses biometric technology, thereby offering accurate and precise authentication. The device should also provide a mechanism that ensures the integrity of the captured images, thereby preventing falsification or modification of the biometric information or image subsequent to capture and storage. Finally, the device should be simple to use, with the authentication mechanisms functioning in a manner both convenient and unobtrusive to the photographer.

SUMMARY

The presently preferred embodiment of the invention provides an imaging device that stores biometric information in conjunction with a captured image. Biometric information indicating the identity of the operator of the device is obtained from at least one biometric sensor substantially coincident in time with the capture of an image by the imaging device. The biometric information and captured image are then stored in a manner securely associating each with the other. At a later time, biometric information is obtained from a supposed operator of the imaging device. By comparing this candidate biometric information with the stored biometric information, the supposed operator may be authenticated as the operator of the imaging device at the time of capture of the stored image.

Prior to storage, the biometric information and captured image may be processed in a manner allowing for subsequent verification that the stored biometric information and stored image have not been altered or falsified. In the presently preferred embodiment of the invention, the imaging device is a digital imaging device, such as a digital camera. In this embodiment, a digital signature is used as the verification mechanism. The digital signature may be computed for the entire captured image and biometric information, or for a message digest computed using a hashing algorithm. Encryption may be applied to the stored image itself to ensure secrecy of the image contents.

In another, equally preferred embodiment of the invention, the biometric sensor or sensors may include, for example, any of fingerprint sensors, finger sensors, palm sensors, iris sensors, retina sensors, eye sensors, and face sensors. These sensors may operate, for example, using any of capacitance measurements, resistance measurements, optical measurements, and ultrasonic measurements. It is also possible for the biometric information to be analyzed to create one or more biometric signatures that provide a reduced representation of the biometric information obtained. The candidate biometric information may be obtained directly from the supposed operator of the imaging device at the time of authentication, using biometric sensors similar to those used in obtaining the stored biometric information, or they may be obtained from a database of biometric information.

DESCRIPTION

The invention provides an imaging device that stores biometric information in conjunction with a captured image. The biometric information is gathered, processed, and stored in a manner that allows accurate and precise authentication, at a subsequent time, of the operator of the imaging device at the time of image capture, i.e. the photographer who captured the image.

Figure 1:
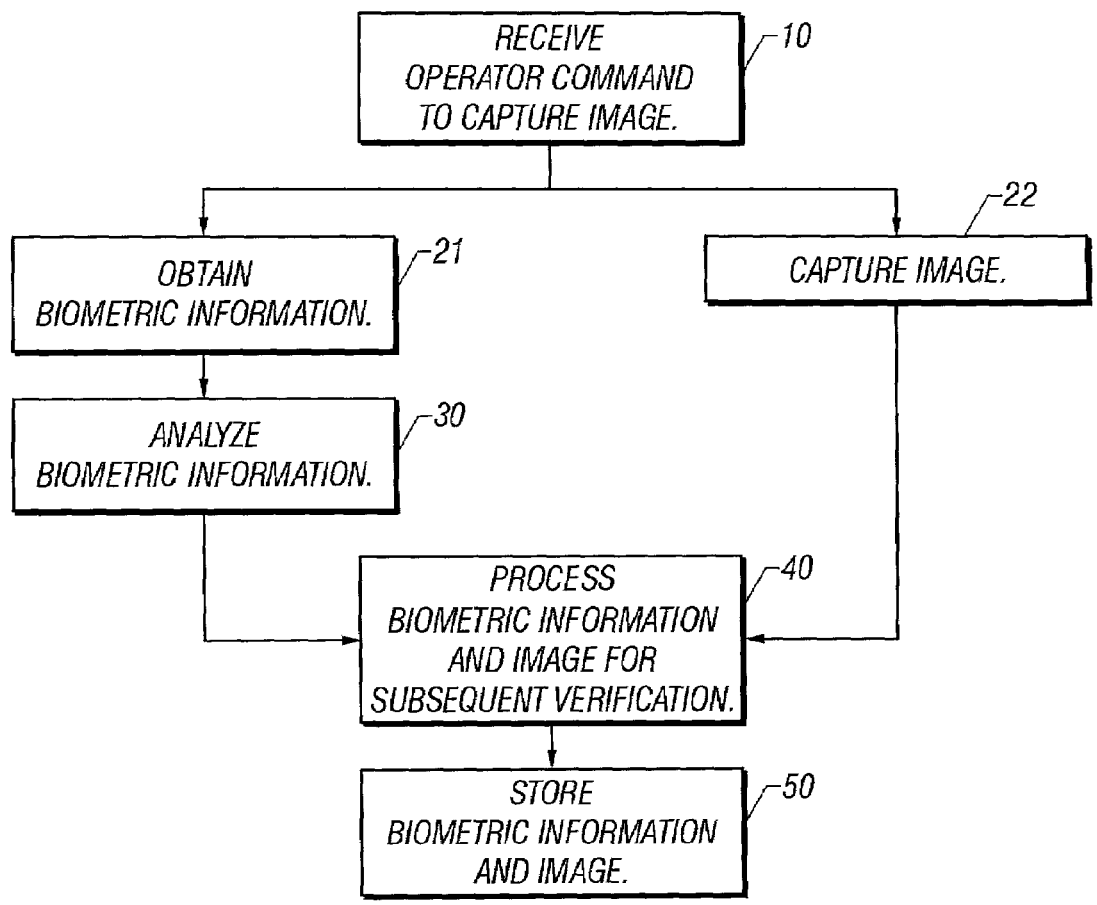
FIG. 1 shows a sequence of operations, for obtaining and storing biometric information in conjunction with a captured image according to the invention.

FIG. 1 shows a sequence of operations, for obtaining and storing biometric information in conjunction with a captured image according to the invention. The sequence of operations begins with the receipt 10 of an operator command to capture an image. In response to this command, biometric information describing the operator is obtained 21, and an image is captured 22. Operations 21 and 22 are preferably conducted approximately simultaneously, although one operation may be executed before the other. Accordingly, the biometric information obtained is pertinent to the operator of the imaging device at the time of image capture. If necessary, after the biometric information has been obtained, it is analyzed 30 to extract information uniquely identifying the operator of the imaging device. Upon completion of both the capture of the image and any analysis of the biometric information, the biometric information and image are processed 40 in a manner facilitating subsequent verification of the biometric information and image. The biometric information and image are then stored 50 in a memory controlled by the imaging device.

Figure 2:
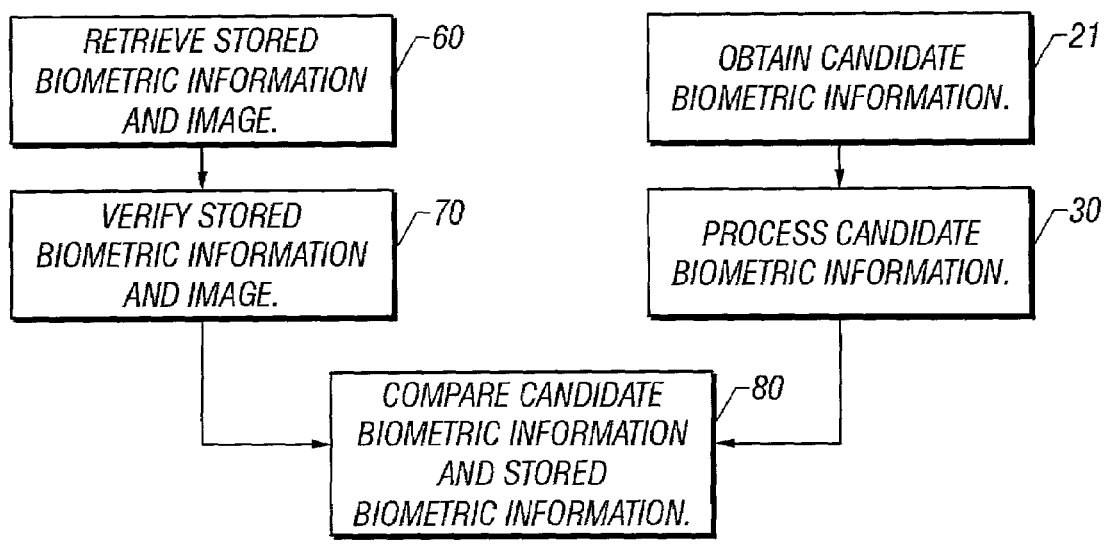
FIG. 2 shows a sequence of operations, for verifying stored biometric information and a stored image, and for authenticating the identity of the operator of an imaging device at the time of image capture according to the invention.

FIG. 2 shows a sequence of operations, for verifying stored biometric information and a stored image, and authenticating the identity of the operator of an imaging device at the time of image capture according to the present invention. First, the stored biometric information and stored image are retrieved 60 from the memory controlled by the imaging device. The retrieved biometric information and image are then verified 70 to confirm that each has not been modified or falsified since the time of storage. In addition, candidate biometric information is obtained 21 for a supposed operator of the imaging device. The biometric information may be obtained in a manner similar to that used to gather the biometric information stored in conjunction with the captured image. If needed, this biometric information is then analyzed 30 to extract information uniquely identifying the supposed operator of the imaging device. The candidate biometric information is then compared 80 with the stored biometric information. If the candidate and stored biometric information are found to match, the supposed operator of the imaging device can be authenticated as the operator of the imaging device at the time of image capture.

In operation, the biometric information obtained from the sensors is sufficient to identify the imaging device operator uniquely within the entire human population. More specifically, it is extremely unlikely that the sensor and analysis combination would generate the same information for any two individuals within the human population. The sensor and analysis combination is therefore, very precise. Furthermore, it is extremely unlikely that the sensor and analysis combination would fail to identify an individual correctly. The combination is therefore also very accurate. In the preferred embodiment, sensor and analysis combinations are chosen, for reasons of cost effectiveness, user convenience, or computational simplicity, that may not achieve such levels of accuracy and precision. The desired level of accuracy and precision that must be provided by a sensor and analysis combination is determined by the reliability required for the intended application of the imaging device. With these considerations in mind, the biometric information is said to indicate the identity of the operator.

Figure 3:
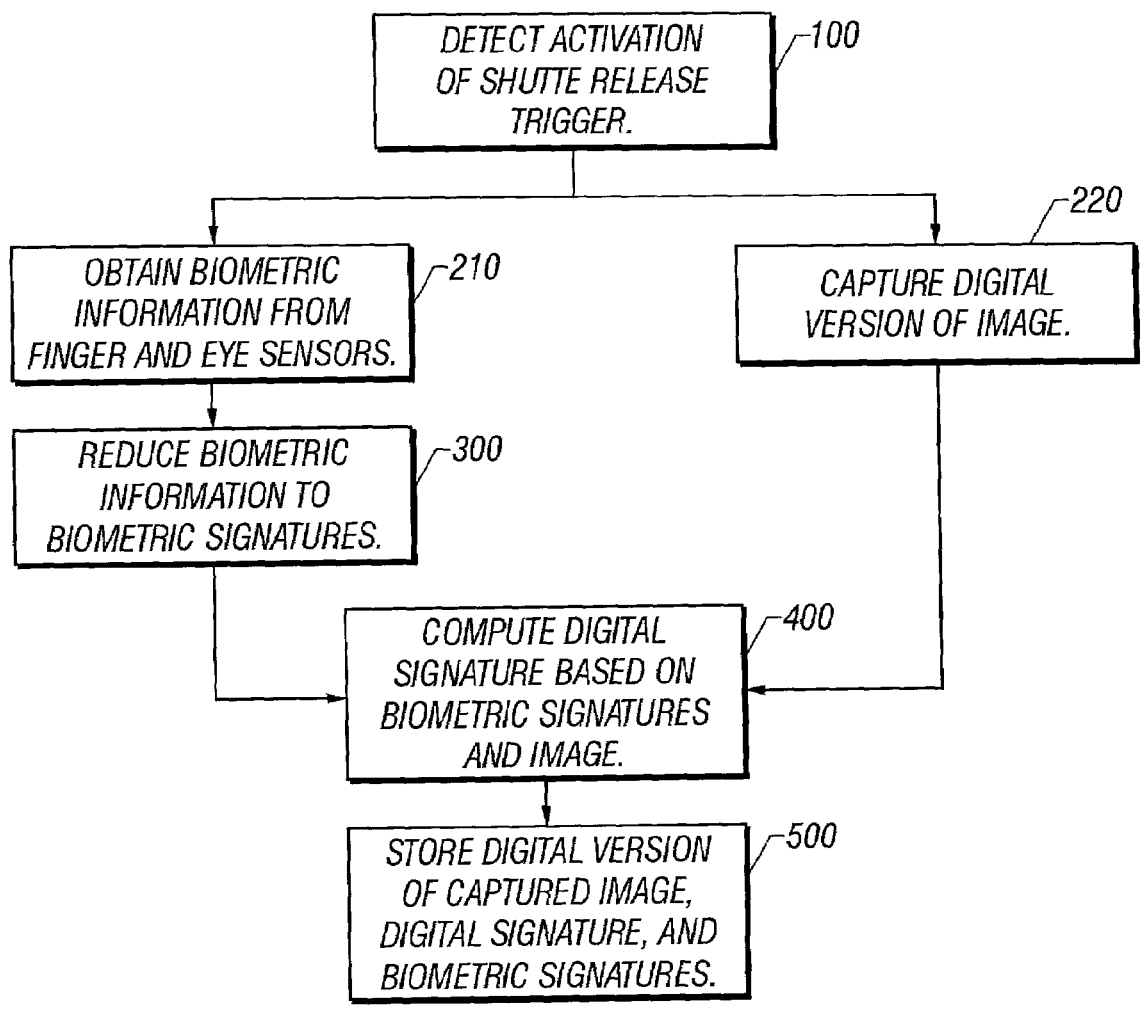
FIG. 3 shows a sequence of operations, for obtaining and storing biometric information in conjunction with a captured image according to the invention.

FIG. 3 shows a sequence of operations, for obtaining and storing biometric information in conjunction with a captured image according to the invention. In the preferred embodiment, the imaging device is a digital camera equipped with biometric sensors for analyzing the finger and eye of the camera operator. The sequence of operation begins with the detection 100 of an operator activating a shutter release trigger. Preferably, this occurs when the operator depresses a shutter release button on the digital camera. In response to this command, a digital version of the image is captured 220, and is preferably stored in a memory within the digital camera.

Essentially simultaneously with the image capture, biometric information describing the operator is obtained 210 from biometric finger and/or eye sensors. Preferably, the finger sensor is a fingerprint scanner with silicon based capacitive sensors, such as the Infineon FingerTIP™ device. The eye sensor is preferably an iris scanner, such as that offered by Iridian, Inc. Because the biometric information is obtained at essentially the same time that the image is captured, the biometric information is pertinent to the operator at the time of image capture.

Typically, the finger and eye sensors initially obtain a digital representation of an image of the scanned fingerprint and iris, respectively. Once the biometric information is obtained, it is reduced 300 to a biometric signature. In the case of the fingerprint scan, the fingerprint pattern may be analyzed to find the location and orientation of various minutiae. The type and quality of the minutiae may also be noted. The resulting description of the fingerprint, while expressed with a greatly reduced amount of memory as compared to the digital image version of the biometric information, is still capable of uniquely identifying the operator of the digital camera. As is well known in the prior art, an analogous process may be conducted to reduce the patterns observed on the operator's iris to a unique biometric signature. Typically, this process involves the use of wavelets to map segments of the iris onto a set of vectors, known as phasors.

Following the reduction of the biometric information to a biometric signature and the capture of a digital version of the image, the biometric information and the digital version of the image are processed in a manner that allows the device to compute 400 a digital signature based on both the biometric information and image content.

Figure 4:
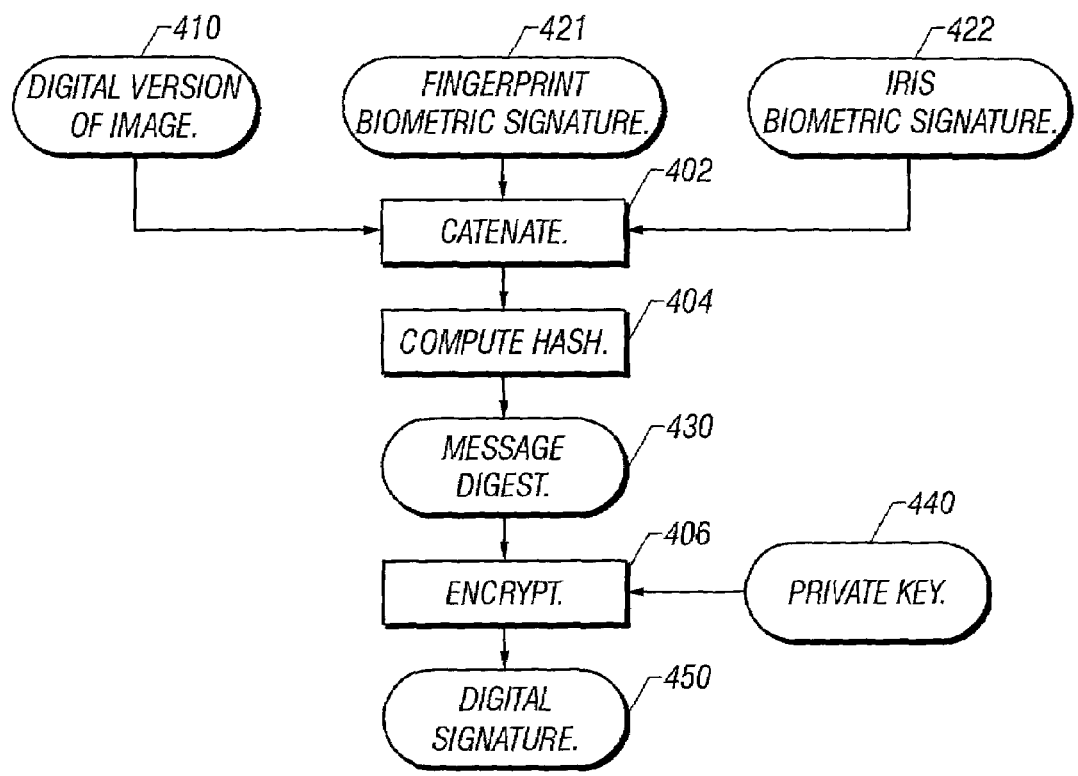
FIG. 4 shows a sequence of operations, for computing a digital signature based on the biometric information and a captured image according to the invention.

FIG. 4 shows a sequence of operations, for computing a digital signature based on the biometric information and a captured image according to the invention. First, the fingerprint biometric signature 421 and the iris biometric signature 422 are catenated 402 with the digital version of the image 410. Following this operation, a hash of the catenated data is computed 404, generating a message digest 430. The message digest is generated using any suitable technique, such as MD5, as is known in the art. The message digest irreversibly and uniquely associates the biometric signatures and image content with one another. The message digest 430 is then encrypted 406, producing a digital signature 450. The encryption process ensures that the message digest, and therefore neither the image content nor the biometric signatures, can be altered or falsified. The encryption may be accomplished using a public key encryption scheme, such as the RSA cryptosystem, using a private key 440 uniquely associated with the digital camera. Such an operation is well detailed in the prior art, including U.S. Pat. No. 5,499,294.

Following the computation of the digital signature, the biometric signatures 421 and 422, the digital signature 450, and the digital version 410 of the image with which they are associated are stored 500 in a memory controlled by the digital camera. This device is preferably a compact, removable, non-volatile memory device. Several such devices are well known among prior art digital cameras, including but not limited toCompact Flash™ cards, Memory Sticks™, and CDRW disc drives.

In summary, each image is stored in conjunction with biometric information uniquely identifying the operator of the device at the time of image capture. The biometric information is stored in a memory effcient format. The biometric signature is uniquely and irreversibly associated with the image through a hashing algorithm. The integrity of this association is then ensured through an encryption process.

Figure 5:
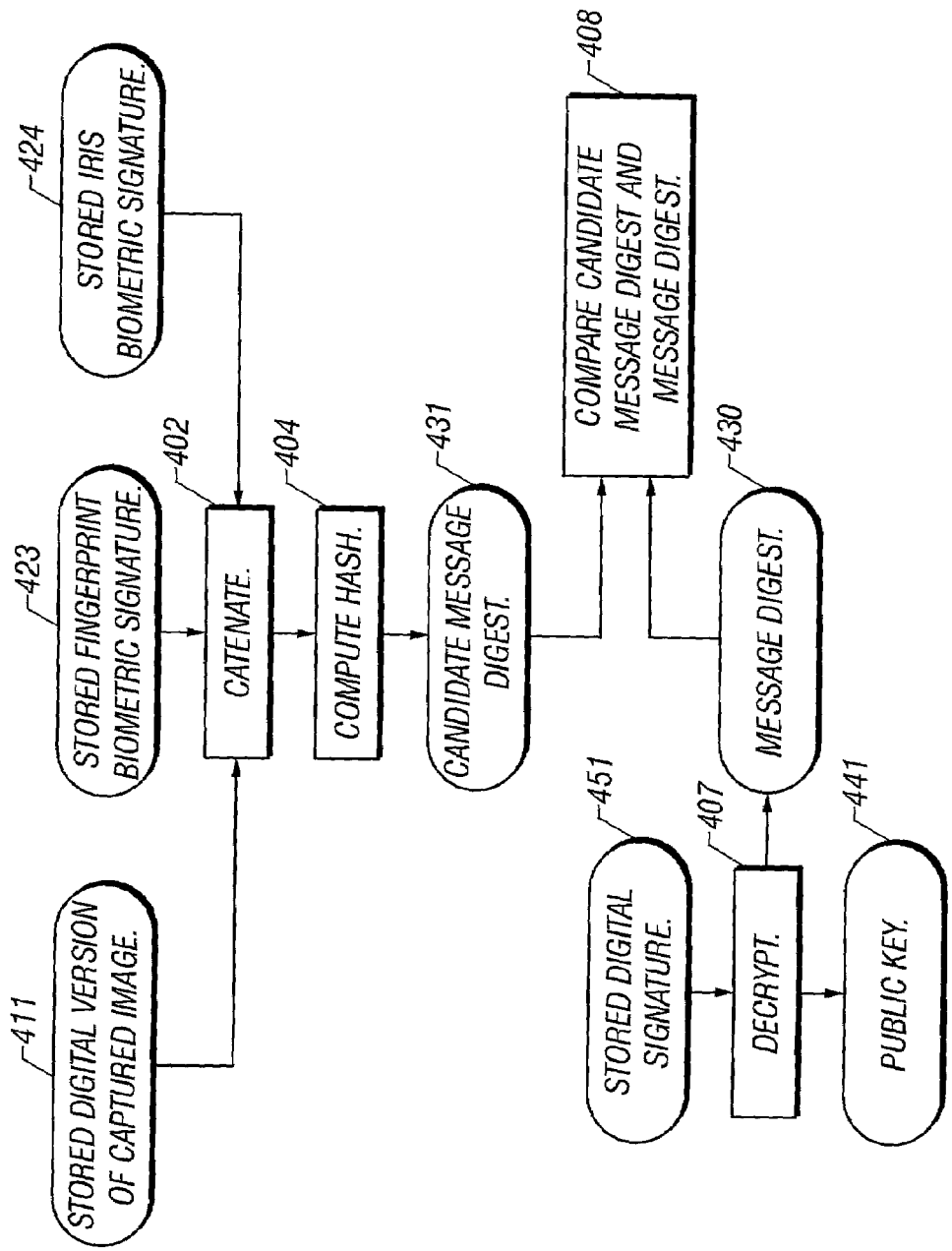
FIG. 5 shows a sequence of operations, for verifying the integrity of a digital version of a captured image and the associated biometric signatures according to the invention.

FIG. 5 shows a sequence of operations, for verifying the integrity of a digital version of a captured image and the associated biometric signatures according to the invention. The verification process begins with the catenation 402 of the stored fingerprint biometric signature 423 and the stored iris biometric signature 424 with the stored digital version of the captured image 411. Following this operation, a hash of the catenated stored data is computed 404, generating a candidate message digest 431. The catenation operation and hashing algorithm are preferably the same as those that are used in the computation of the digital signature.

In addition, the stored digital signature 451 is decrypted 407 using a decryption scheme complementary to the encryption scheme 406 used in the generation of the digital signature. This may require the use of a public key 441, the generation and management of which are well described in the prior art, including U.S. Pat. No. 5,499,294. The result of the decryption scheme is an exact replica of the message digest 430 computed during the generation of the digital signature 450.

The candidate message digest 431 and the message digest 430 are then compared 408. If the two are not identical, it is possible that one or more of the stored fingerprint biometric signature 423, the stored iris biometric signature 424, and the stored digital version of the captured image 411 have been altered or falsified since the time of image capture. If the two message digests are identical, the integrity of the stored information is ensured, and it is certain that the stored fingerprint biometric signature 423, the stored iris biometric signature 424, and the stored digital version of the captured image 411 are identical to the fingerprint biometric signature 421, the iris biometric signature 422, and the digital version of the captured image 410, respectively.

Figure 6:
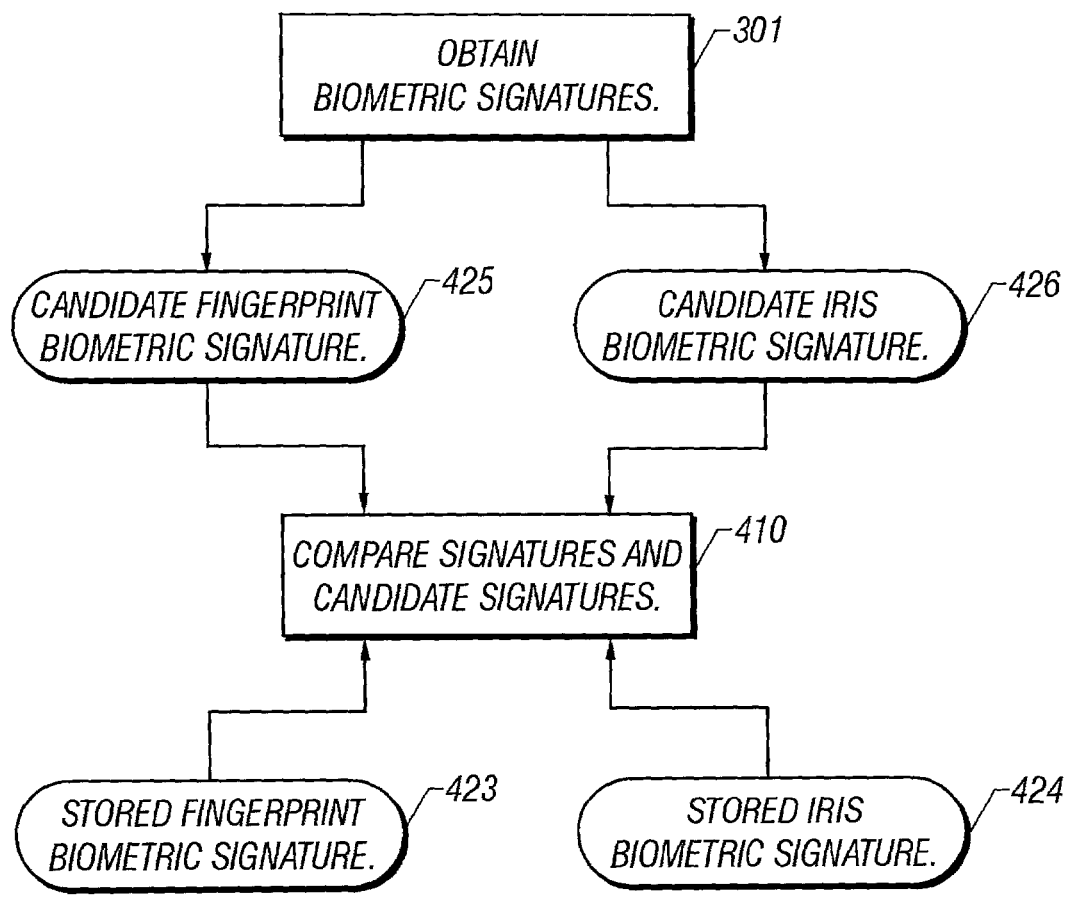
FIG. 6 shows a sequence of operations, for authenticating the identity of the operator of an imaging device at the time of image capture according to the invention.

FIG. 6 shows a sequence of operations, for authenticating the identity of the operator of an imaging device at the time of image capture according to the invention. First, biometric signatures are obtained 301 for a supposed operator of the imaging device at the time of image capture. If the supposed operator of the imaging device is present, this information can be obtained as in operation 210, using a fingerprint scanner and an iris scanner, and then reduced to a candidate fingerprint biometric signature 425 and a candidate iris biometric signature 426 through operation 300. Alternatively, the biometric signatures may be obtained from a directory of such signatures, if the supposed operator is registered in such a directory. Once obtained, the candidate fingerprint biometric signature 425 and the candidate iris biometric signature 426 are compared with the stored fingerprint biometric signature 423 and the stored iris biometric signature 424, respectively. If the respective biometric signatures do not match, the supposed operator cannot be authenticated as the operator of the imaging device at the time of image capture. If the biometric signatures do match, the supposed operator is authenticated as the operator of the imaging device at the time of image capture.

Figure 7:
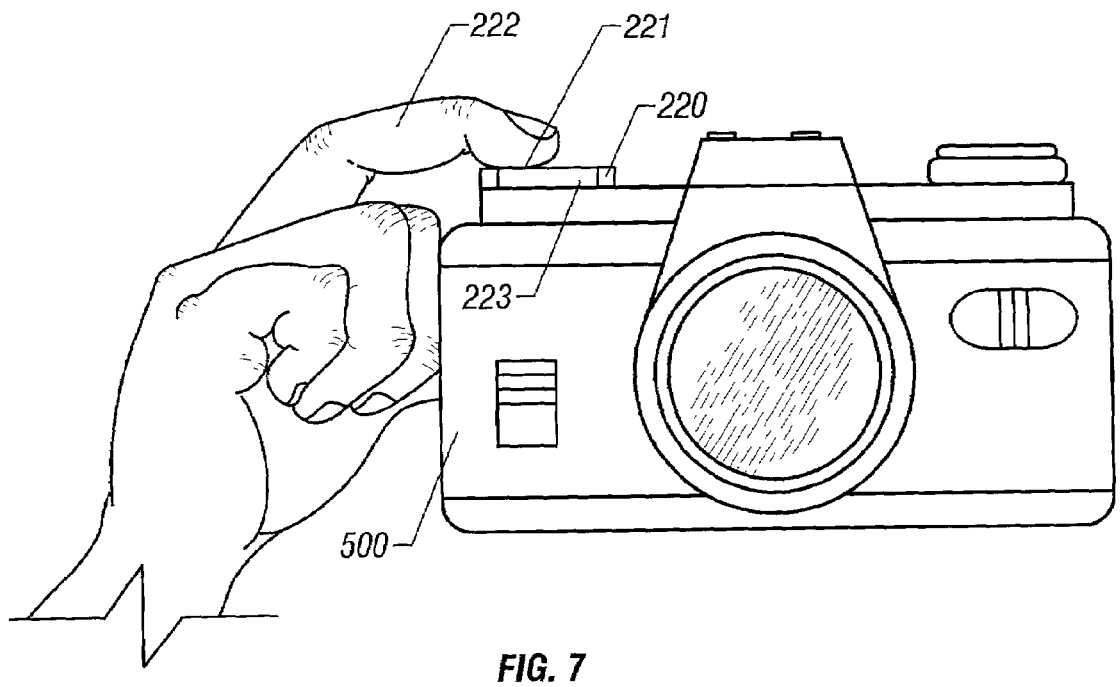
FIG. 7 shows a simplified sketch of a camera that is capable of obtaining biometric information from an operator's fingerprint according to the invention.

FIG. 7 shows a simplified sketch of a camera that is capable of obtaining biometric information from an operator's fingerprint according to the invention. A fingerprint scanner 220 is arranged such that its scanning surface is coincident with the upper surface of a shutter release button 223. It is positioned so that it may obtain a fingerprint scan of the fingerprint 221 of the finger 222 of the camera 500 operator. The fingerprint scanner may therefore obtain a scan of the operator's fingerprint as the operator depresses the shutter release button.

Figure 8:
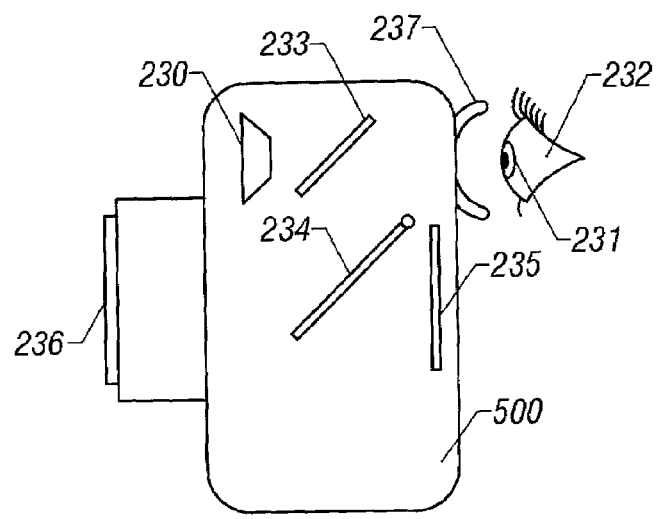
FIG. 8 shows a simplified sketch of a camera that is capable of obtaining biometric information from an operator's fingerprint according to the invention.

FIG. 8 shows a simplified sketch of a camera that is capable of obtaining biometric information from an operator's iris according to the invention. An iris scanner 230 is positioned to view the iris 231 of the eye 232 of the operator of the camera through a beamsplitter 233. The beamsplitter also allows the operator to view the image subject through the lens 236, as reflected by a reflex mirror 234. The reflex mirror is hinged, allowing the mirror to be pivotably removed from the pathway passing light from the lens to a photographic film, CCD, or other recording medium 235. Thus, as the operator peers into the viewfinder 237 to compose an image, the iris scanner is aligned to capture a scan of the operator's iris.

The process by which the operator composes and then commands the capture of an image automatically aligns the operator's finger and eye for capture of biometric information. The invention is therefore both convenient and simple to operate because the biometric information is acquired in a manner unobtrusive to the operator of the imaging device.

Figure 9:
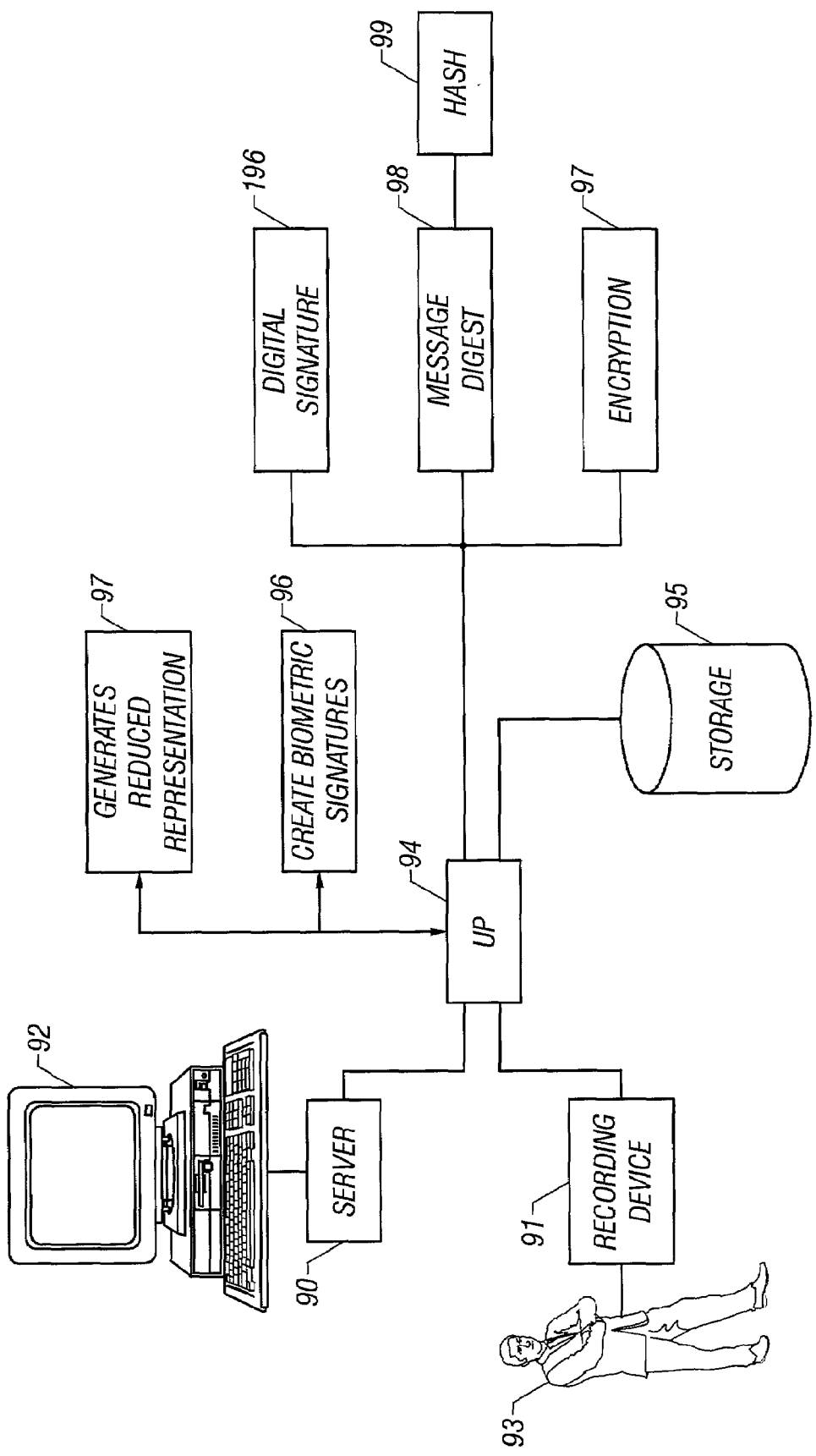
FIG. 9 is a block schematic diagram showing an apparatus for authenticating an imaging device operator's identity according to the invention.

FIG. 9 is a block schematic diagram showing an apparatus for authenticating an imaging device operator's identity according to the invention. FIG. 9 shows a biometric sensor 90, for example for capturing an imaging device operator's fingerprint 92, and a recording device 91 for capturing an image of a subject 93. The preferred embodiment of the invention operates under supervision of a processor 94 that captures biometric information and image information at substantially the same time and that stores such information together, for example in a memory 95. The processor implements various modules that perform such processing functions as the creation of a biometric signatures 96, the generation of a reduced representation of the biometric signature 97, the creation of a digital signature 196, the use of a message digest to create the digital signature 98, the use of a hash in connection with the message digest 99, and the implementation of encryption 97, all as disclosed in detail above.

Other embodiments of the invention may differ from the above description of the preferred embodiment. Most notably, in one alternative embodiment, the imaging device may be other than a digital camera. The use of film based cameras, including emulsion film based cameras, is also possible. In this case, the biometric information may be stored within the image on the emulsion based film as described in U.S. Pat. No. 6,111,954, or on the film in a region exterior to the imaging region. Finally, biometric information may also be gathered in conjunction with motion video.

In another embodiment of the invention, acquisition of biometric information may not occur in conjunction with every image capture, but instead only for those image acquisitions selected by the user. For example, the imaging device may offer user settings or control menus that allow an operator to enable and disable the acquisition of biometric information selectively. In the case of motion video, biometric information may be obtained in conjunction with the initial image of a motion video sequence, a selected image or images within the motion video sequence, or the final image of the motion video sequence. The operator of the imaging device may also be given confirmation that biometric information was successfully obtained. Further confirmation may be provided to indicate that the information was successfully analyzed, processed, and stored.

While the type and placement of the the biometric sensors used in the preferred embodiment are particularly convenient due to the resulting unobtrusive manner in which biometric information is gathered, other types and placements of sensors are possible. Furthermore, while the use of two biometric sensors in the preferred embodiment offers an extra degree or reliability in authenticating operator identity, the invention may operate with only a single biometric sensor.

In the preferred embodiment, a fingerprint scanner having silicon based capacitive sensors is employed, because this technology offers a small and accurate sensor. However, as is well known in the art, other suitable technologies are available, including optical and ultrasonic based fingerprint scanners. Although typically more diffcult to obtain, a retinal scan may be used in addition to, or instead of, the iris scan. Hand scans or palm scans may also be employed. Facial scans may also prove practical in those imaging devices that do not use a traditional viewfinder. In this case, the operator may be further removed from the imaging device, and a scan of the operator's face may be obtained with an additional lens aligned to capture the essential features of the face.

The placement of the biometric sensors may also differ from that of the preferred embodiment based on the specific form and usage of the imaging device. For example, in the case of a palm scanner, the sensor may be built into a grip or handle of the imaging device.

In another embodiment of the invention, the biometric information gathered by the biometric sensors may not be analyzed 30 before being processed 40. In this embodiment, the biometric information is processed and stored as gathered by the sensors. For example, in the case of a fingerprint sensor, the fingerprint scan is processed as a digital image of the operator's fingerprint, and is not reduced to a fingerprint biometric signature. Similarly, an iris scan may be processed as a digital image of the operator's iris.

In another embodiment of the invention, when the biometric information and captured image are processed 40 for subsequent verification, information such as the time, date, and location of image capture may also be incorporated. In the preferred embodiment, this information may simply be catenated 402 with the digital version of the captured image and the biometric signatures. The information may be acquired from a single global positioning unit, or by one of many other methods described in the prior art. Additional information such as imaging device diagnostics and settings, and environmental conditions such as temperature, humidity, altitude, or directional orientation may be included as warranted by specific imaging device applications. Further, in addition to biometric information, the operator may also be required to enter a password or personal identification number to operate the camera and/or which may also be recorded with the image.

The hashing operation 404 may be omitted in some embodiments. In this case the digital signature may be computed directly from the captured image and the biometric information. Other embodiments may additionally encrypt the captured version of the image, ensuring the secrecy of the image between the time of storage and the time of authentication. The encryption algorithm used for this process may differ from that used to generate the digital signature.

In general, any of a great number of encryption algorithms may be used during the processing 40 of the biometric information and captured image. Alternative embodiments employ one or more public-key encryption schemes, one or more private-key (symmetric) schemes, or a combination of public- and private-key schemes. Such techniques are well documented in the prior art. If a key or keys must be generated as part of the encryption scheme, this may be accomplished using the randomness found within the captured image or biometric information. Alternatively the key or keys may be chosen or provided by the operator. Still other key generation techniques are well known in the prior art.

Alternative embodiments of the invention may omit entirely the operation for processing 40 the biometric information and captured image for subsequent verification. While omitting this operation does reduce the ability to verify subsequently that the biometric information and captured have image have not been tampered with between the time of storage and verification, it does not directly inhibit the use of biometric information to authenticate the identify of the imaging device operator. If the processing step is omitted, the biometric information may be stored in a manner reliably associating it with the captured image to which it pertains.

Additional embodiments of the invention may store the biometric and environmental information using one of a number of methods, including electronic, magnetic, optical, mechanical, or chemical memory devices of a volatile or non-volatile nature, as well as via communications schemes, such as IR, IEEE 802.11. Blue tooth and the like, for storage at a server or other remote storage facility. The biometric information may be incorporated within or stored separately from the captured image.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A method for authenticating an imaging device operator's identity, comprising the steps of:
    obtaining, from at least one biometric sensor, biometric information indicating
said operator's identity;
    independently capturing an image with said imaging device, substantially simultaneously with the step of obtaining said biometric information with said at least one biometric sensor;
    storing said biometric information together with said captured image;
    wherein said identity of said operator is authenticated by said stored biometric information.

2. The method of claim 1, wherein said at least one biometric sensor is selected from the group consisting of fingerprint sensors, finger sensors, palm sensors, iris sensors, retina sensors, eye sensors, and face sensors.

3. The method of claim 1, wherein said at least one biometric sensor is selected from the group consisting of capacitance measurement based sensors, resistance measurement based sensors, optical measurement based sensors, and ultrasonic measurement based sensors.

4. The method of claim 1, further comprising the step of:
    analyzing said biometric Information to create at least one biometric signature
from said biometric information.

5. The method of claim 4, further comprising the step of:
    using said biometric signature to provide a reduced representation of said biometric information.

6. The method of claim 1, wherein said imaging device is any of a digital imaging device and a recording film based imaging device.

7. The method of claim 1, further comprising the steps of:
    processing said biometric information and said captured image, prior to storing said biometric information and prior to storing said captured image.

8. The method of claim 7, further comprising the step of:
    subsequently verificating that said stored biometric information and said stored image have not been altered and have not been falsified.

9. The method of claim 7, wherein said step of processing said biometric information and said captured image comprises computing a digital signature.

10. The method of claim 9, wherein said digital signature is generated using a message digest.

11. The method of claim 10, wherein said message digest is created using a hashing
algorithm applied to said captured image and said biometric information.

12. The method of claim 7, wherein said step of processing said biometric information and said captured image comprises the step of:
    encrypting said captured image to produce an encrypted image.

13. A method for authenticating the identity of an operator of an imaging device, comprising the steps of:
    retrieving an image captured by said image device;
    retrieving biometric information that is associated with and stored with said image, wherein said biometric information is obtained by at least one biometric sensor independently of capture of said image by said imaging device, wherein said biometric information is obtained at substantially the same time that said image is captured;
    obtaining candidate biometric information indicating the identity of a supposed operator of said imaging device;
    comparing said candidate biometric information and said stored biometric information; and
    authenticating said supposed operator as said imaging device operator at the time of capture of said image if said stored biometric information substantially matches said candidate biometric information.

14. The method of claim 13, wherein said candidate biometric information is obtained directly from said supposed operator using a least one biometric sensor.

15. The method of claim 13, wherein said candidate biometric information is obtained from a database of biometric information.

16. The method of claim 13, wherein said imaging device is any of a digital imaging device and a recording film based imaging device.

17. The method of claim 13, further comprising the step of:
verifying said stored biometric information and said stored image, after retrieving said stored biometric information, after retrieving said stored image, and prior to comparing said candidate biometric information and said stored biometric information to ensure that said stored biometric information and said stored image have not been altered and/or falsified.

18. The method of claim 17, wherein said step of verifying said biometric information and said captured image comprises the step of:
verifying a digital signature.

19. A method for authenticating an imaging device operator's identity, comprising the steps of:
obtaining, from at least one biometric sensor, biometric information indicating said operator's identity;
independently capturing an image with said imaging device, substantially simultaneously with the step of obtaining said biometric information from said at least one biometric sensor;
storing said biometric Information, together with said captured image; subsequently:
retrieving said image;
retrieving said biometric information;
obtaining candidate biometric information indicating the identity of a supposed operator of said imaging device;
comparing said candidate biometric information and said stored biometric information; and
authenticating said supposed operator as said imaging device operator at the time of capture of said Image if said stored biometric information substantially matches said candidate biometric information.

20. The method of claim 19, wherein said at least one biometric sensor is selected from the group consisting of fingerprint sensors, finger sensors, palm sensors, iris sensors, retina sensors, eye sensors, and face sensors.

21. The method of claim 19, wherein said at least one biometric sensor is selected from the group consisting of capacitance measurement based sensors, resistance measurement based sensors, optical measurement based sensors, and ultrasonic measurement based sensors.

22. The method of claim 19, further comprising the step of:
analyzing said biometric information to create at least one biometric signature from said biometric information.

23. The method of claim 19, further comprising the step of:
using said biometric signature to provide a reduced representation of said biometric information.

24. The method of claim 19, wherein said imaging device is any of a digital imaging device and a recording film based imaging device.

25. The method of claim 19, further comprising the step of:
processing said biometric information and said captured image, prior to storing said biometric information and prior to storing said captured image.

26. The method of claim 25, further comprising the step of:
verifying said biometric information and said image, after retrieving said biometric information, after retrieving said image, and prior to comparing said candidate biometric information and said biometric information.

27. The method of claim 26, wherein said processing step conditions said stored biometric information and said image for subsequent verification, and wherein said verifying step ensures that said stored biometric information and said image have not been altered and/or falsified.

28. The method of claim 26, wherein said processing step comprises:
computing a digital signature.

29. The method of claim 26, wherein said verifying step comprises:
verifying said digital signature.

30. The method of claim 29, wherein said digital signature is generated using a message digest.

31. The method of claim 30, wherein said message digest is created using a
hashing algorithm applied to said captured image and said biometric information.

32. The method of claim 26, wherein said processing step comprises:
encrypting said captured image to produce an encrypted image.

33. An apparatus for authenticating an imaging device operator's identity comprising:
at least one biometric sensor for capturing biometric information indicative of said operator's identity;
a recording device for independently capturing an image substantially simultaneously with said capture of biometic information with said at least one biometric sensor; and
a medium for storing said biometric information together with said stored image for subsequent authentication of said operator's identity based on said stored biometric information.

34. The apparatus of claim 33, wherein said at least one biometric sensor is selected from the group consisting of fingerprint sensors, finger sensors, palm sensors, iris sensors, and face sensors.

35. The apparatus of claim 33, wherein said at least one biometric sensor is selected from the group consisting of capacitance measurement based sensors, resistance measurement based sensors, optical measurement based sensors, and ultrasonic measurement based sensors.

36. The apparatus of claim 33, further comprising:
means for analyzing said biometric information to create at least one biometric
signature form said biometric information.

37. The apparatus of claim 33, further comprising:
means for generating a reduced representation of said biometric information.

38. The apparatus of claim 33, wherein said imaging device is any of a digital imaging device and a recording film based imaging device.

39. The apparatus of claim 33, further comprising:
a processor for processing said biometric information and said captured image, prior to storing said biometric information and prior to storing said captured image.

40. The apparatus of claim 39, wherein said processor subsequently verifies that said stored biometric information and said image have not been altered and/or falsified.

41. The apparatus of claim 39, wherein said processor computes a digital signature.

42. The apparatus of claim 41, wherein said digital signature Is generated using a message digest.

43. The apparatus of claim 42, wherein said message digest is created using a hashing algorithm applied to said captured image and said biometric information.

44. The apparatus of claim 39, wherein said processor encrypts said captured image to produce an encrypted image.

* * * * *